United States Patent Office 3,012,034
Patented Dec. 5, 1961

3,012,034
6-PTERIDINECARBOXAMIDINE AND
AMIDOXIME DERIVATIVES
Edward C. Taylor, 288 Western Way, Princeton, N.J.
No Drawing. Filed Oct. 3, 1960, Ser. No. 59,834
5 Claims. (Cl. 260—251.5)

This invention relates to novel 6-pteridinecarboxamidine and amidoxime derivatives having diuretic and natriuretic activity. In addition these derivatives have important hypotensive activity.

The novel pteridine derivatives of this invention are represented by the following structural formula:

FORMULA I

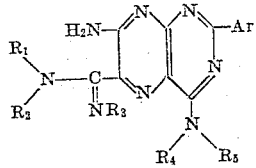

when:
Ar represents phenyl, chlorophenyl, tolyl, methoxyphenyl, α,α,α-trifluorotolyl, hydroxyphenyl, aminophenyl, thienyl or pyridyl;
$R_1$ and $R_2$ represents hydrogen, lower alkyl or aralkyl having 7 to 8 carbon atoms such as benzyl or phenethyl;
$R_3$ represents hydrogen, or, when $R_1$ and $R_2$ are hydrogen, hydroxy, lower alkoxy or aralkoxy having 7 to 8 carbon atoms such as benzyloxy or phenethoxy; and
$R_4$ and $R_5$ represent hydrogen or lower alkyl.

Advantageous compounds of this invention are represented by the following formula:

FORMULA II

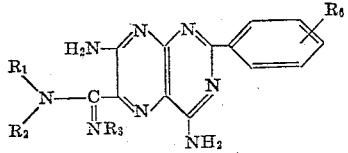

when:
$R_1$ and $R_2$ are hydrogen, methyl or benzyl;
$R_3$ is hydrogen, or, when $R_1$ and $R_2$ are hydrogen, methoxy or benzyloxy; and
$R_6$ is hydrogen, chloro, methyl, methoxy, trifluoromethyl, hydroxy or amino.

The terms "lower alkyl" and "lower alkoxy" where used herein denote groups having a maximum of 4 carbon atoms, preferably not more than 2 carbon atoms.

The pteridinecarboxamidines and amidoximes of this invention are prepared from the corresponding 6-cyanopteridines which are described fully in my copending application, Serial No. 831,950, filed August 6, 1959, now U.S. Patent No. 2,963,479, of which the present application is a continuation-in-part.

Briefly, the 6-cyanopteridines are prepared by condensing a 4,6-diamino-2-aryl - 5 - nitrosopyrimidine with malononitrile by heating in a liquid tertiary amine such as pyridine at temperatures above 50° C. for from about 1–12 hours.

The carboxamidines and amidoximes of this invention are prepared by reacting a 6-cyanopteridine derivative with ammonia or with an appropriately substituted amine in an hydroxylated polar organic solvent having less than 6 carbon atoms such as 2-ethoxyethanol, 2-methoxyethanol, ethylene glycol or propylene glycol. The reaction is carried out at temperatures of about 25-200° C. for about 10 minutes to 8 hours. In certain instances the reaction proceeds at room temperature, in other instances it is preferable to carry out the reaction at elevated temperatures conveniently at the reflux temperature of the solvent. The resulting carboxamidines and amidoximes often separate upon dilution of the reaction mixture with water and are isolated by filtration.

Pharmaceutically acceptable, acid addition salts of the compounds of this invention formed with nontoxic acids such as hydrochloric, sulfuric, methylsulfonic, phosphoric, etc. acid. These salts which can be used alternatively with the parent compounds are prepared by reacting the bases with the desired acid in a lower alcohol then evaporating the alcohol solvent to leave the salt. Alternatively the salt formation is carried out in an aqueous slurry or solution. In addition the compounds of Formula I in which $R_3$ is hydroxy form alkali metal salts such as sodium or potassium salts.

It will be readily apparent to one skilled in the art that certain compounds of this invention notably those in which $R_1$ is hydrogen may be present in tautomeric forms, that is the double bond in the group at the 6-position may shift. It is intended to include these possible tautomeric forms in the present invention.

The following examples are not limiting but are illustrative of compounds of this invention and will serve to make fully apparent all of the compounds embraced by the general formula given above.

Example 1

A solution of 20.0 g. of 4,6-diamino-5-nitroso-2-phenyl-pyrimidine and 7.0 g. of malononitrile in 200 ml. of pyridine is heated at 90–95° C. for four hours. The resulting reaction mixture is then evaporated in a rotating flash evaporator to half volume and diluted with 100 ml. of water. The yellow crystalline solid which separates is collected by filtration, washed with water and recrystallized from aqueous dimethylformamide to give 4,7-diamino-6-cyano-2-phenylpteridine, M.P. >360° C.

A mixture of 10.8 g. of hydroxylamine hydrochloride, 8.25 g. of sodium methoxide and 100 ml. of 2-ethoxyethanol is stirred at room temperature for 30 minutes, then filtered to remove sodium chloride. To the filtrate is added 4.0 g. of 4,7-diamino-6- cyano-2-phenylpteridine. The reaction mixture is stirred at room temperature for 30 minutes. The resulting clear, dark red solution is diluted with water to separate a yellow solid, 4,7-diamino-2-phenyl-6-pteridineamidoxime, M.P. >330° C. after recrystallization from aqueous dimethylforamide.

Example 2

A suspension of 2.0 g. of 4,7-diamino-6-cyano-2-phenylpteridine, prepared as in Example 1, in 100 ml. of 2-ethoxyethanol and 10 ml. of benzylamine is heated at reflux for 20 minutes. The reaction mixture is diluted with 200 ml. of water. The resulting precipitate is filtered, extracted with boiling ethanol and recrystallized from aqueous dimethylformamide to give 4,7-diamino-2-phenyl - 6-pteridine-N-benzylcarboxamidine, M.P. 270–271° C. (dec.).

Example 3

A mixture of 2.6 g. of 4,7-diamino-6-cyano-2-phenylpteridine, 6.5 g. benzyloxyamine and 100 ml. of 2-methoxyethanol is heated at 100° C. for 15 minutes. Adding water, filtering and recrystallizing the solid product from aqueous dimethylformamide gives 4,7-diamino-2-phenyl-6-pteridine-O-benzylamidoxime.

Example 4

To a stirred solution of 9.55 g. of p-chlorobenzamidine hydrochloride in 200 ml. of methanol is added 11.1 g. of the silver salt of isonitrosomalononitrile. The resulting mixture is stirred for one hour and filtered. The filtrate is exaporated to dryness at 30–35° C. To the residue is added 150 ml. of a solution of 5-ethyl-2-methylpyridine and 2-picoline (2:1). The resulting solution is refluxed for 20 minutes. Addition of water and ethanol precipitates a dark green solid which is isolated by filtration and washed with ethanol to give 4,6-diamino-2-(p-chlorophenyl)-5-nitrosopyrimidine.

A mixture of 2.5 g. of the nitroso compound and 0.7 g. of malononitrile in 50 ml. of pyridine is heated at reflux for six hours. After evaporation and quenching, the desired 2 - (p - chlorophenyl) - 4,7-diamino-6-cyano-pteridine is obtained.

The above prepared cyanopteridine is treated with 100 ml. of 2-ethoxyethanol which is saturated with ammonia. The mixture is stirred for 20 minutes, then treated with water and filtered to give 4,7-diamino-2-(p-chlorophenyl)-6-pteridinecarboxamidine.

Example 5

A mixture of 2.5 g. of 4,7-diamino-6-cyano-2-(p-methoxyphenyl)pteridine, prepared as in Example 4 from p-anisamidine hydrochloride, and 100 ml. of 2-ethoxyethanol saturated with methylamine is stirred and warmed on a steam bath for 20 minutes. Adding water and filtering gives 4,7-diamino-2-(p-methoxyphenyl)-6-pteridine-N-methylcarboxamidine.

Example 6

Dimethylamine in 75 ml. of 2-ethoxyethanol is stirred with 2.0 g. of 4,7-diamino-6-cyano-2-(p-tolyl)-pteridine, prepared as in Example 4 from p-toluamidine hydrochloride. After 30 minutes water is added. The solid product is filtered and recrystallized from aqueous dimethylforamide to give 4,7-diamino-2-(p-tolyl)-6-pteridine-N,N-dimethylcarboxamidine.

Example 7

Five grams of methoxyamine, 1.5 g. of 4,7-diamino-2-(o-chlorophenyl)-6-cyanopteridine (prepared as in Example 4 from o-chlorobenzamidine hydrochloride) and 75 ml. of ethylene glycol are stirred at 50° C. for 25 minutes. Adding water and filtering gives 4,7-diamino-2-(o-chlorophenyl)-6-pteridine-O-methylamidoxime.

Example 8

Dry hydrogen chloride is passed into a cooled solution of 54.5 g. of 3-thiophenecarbonitrile in 75 ml. of absolute ethanol and the resulting solution is allowed to stand for 48 hours. To the solid is added portionwise an 8% solution of dry ammonia in absolute ethanol containing 12 g. of ammonia. The reaction mixture is shaken for 24 hours, allowed to stand for 48 hours and filtered. The filtrate is allowed to evaporate to dryness in the open air. The residue is dissolved in water. The aqueous solution is acidified with concentrated hydrochloric acid, treated with charcoal, filtered and concentrated. The crystals which form are isolated by filtration to give 3-thiophenecarboxamidine hydrochloride.

To a solution of 8.1 g. of 3-thiophenecarboxamidine hydrochloride in 80 ml. of methyl alcohol is added 11.1 g. of the silver salt of isonitrosomalononitrile. The resulting mixture is stirred for 30 minutes and filtered. The filtrate is evaporated to dryness in vacuo. The residue is refluxed with 50 ml. of 5-ethyl-2-methylpyridine for twenty minutes. The mixture is cooled, diluted with 100 ml. of ethanol and filtered to give 4,6-diamino-5-nitroso-2-(3'-thienyl)-pyrimidine.

A solution of 2.0 g. of the pyrimidine and 0.7 g. of malononitrile in 50 ml. of pyridine is heated at 110° C. for eight hours. After quenching in water, 4,7-diamino-6-cyano-2-(3'-thienyl)pteridine is obtained.

The above prepared cyanopteridine (2.5 g.), n-butylamine (5.2 g.) and 100 ml. of 2-ethoxyethanol are refluxed for 25 minutes. Diluting with water and filtering gives 4,7 - diamino - 2-(3'-thienyl)-6-pteridine-N-butylcarboxamidine.

Example 9

A mixture of 1.0 g. of 4,7-diamino-6-cyano-2- (2'-thienyl)pteridine (prepared as in Example 8 from 2-thiophenecarbonitrile), 4.5 g. of butoxyamine and 50 ml. of 2-ethoxyethanol is stirred at room temperature for 30 minutes to give, after diluting with water and filtering, 4,7 - diamino-2-(2'-thienyl)-6-pteridine-O-butylamidoxine.

Example 10

To a mixture of 20 g. of 6-amino-2-phenyl-4-pyrimidol and 10 ml. of dimethylaniline is added 10 ml. of phosphorus oxychloride. The resulting mixture is refluxed for eight hours, then concentrated in vacuo. The residue is poured into water and treated with an excess of concentrated ammonium hydroxide. After heating the mixture on a steam bath for one hour, concentrating in vacuo and cooling, the precipitate is filtered off, washed with water and ground in a mortar with 15 ml. of 1 N sodium hydroxide. The solid material is filtered off and washed with water to give 6-amino-4-chloro-2-phenyl-pyrimidine.

Ten grams of 6-amino-4-chloro-2-phenylpyrimidine and 25 ml. of 25% aqueous methylamine are heated in a bomb at 125° C. for four hours. The product, of 6-amino-4-methylamino-2-phenylpyrimidine, is isolated by filtration.

A mixture of 11.4 g. of 6-amino-4-methylamino-2-phenylpyrimidine and 200 ml. of 10% acetic acid is heated to 90° C. and filtered. The solution is cooled to 3° C. and treated with a solution of 5.0 g. of sodium nitrite in 15 ml. of water added portionwise. After one hour at 0° C. and one hour at room temperature, the mixture is filtered. The solid material obtained is washed with water and dried to give 6-amino-4-methylamino-5-nitroso-2-phenylpyrimidine. This compound (2.6 g.) is reacted with 0.8 g. of malononitrile in 100 ml. of pyridine to give 7-amino-6-cyano-4-methyl-amino-2-phenylpteridine.

A mixture of 4.5 g. of 7-amino-6-cyano-4-methyl-amino-2-phenylpteridine, 12.0 g. of ethoxyamine and 100 ml. of 2-ethoxyethanol is stirred at room temperature for one hour to give, upon dilution with water and filtration, 7 - amino - 4 - methylamino - 2 - phenyl - 6 - pteridine-O-ethylamidoxime.

Example 11

A mixture of 8.0 g. of 6-amino-4-chloro-2-phenyl-pyrimidine, prepared as in Example 10, and 30 ml. of 25% aqueous dimethylamine is heated in a bomb at 125° C. for four hours. 6-amino-4-dimethylamino-2-phenyl-pyrimidine is isolated from the mixture by filtration.

Ten grams of 6-amino-4-dimethylamino-2-phenylpyrimidine and 150 ml. of 10% acetic acid are heated at 90° C. and filtered. The mixture is cooled to 0° C. A solution of 4.0 g. of sodium nitrite in 10 ml. of water is added portionwise and the resulting mixture allowed to stand for one hour at 0° C. and one hour at room temperature. The precipitate is filtered off, washed with water and dried to give 6-amino-4-dimethylamino-5-nitroso-2-phenylpyrimidine. This pyrimidine is heated in pyridine with malononitrile to give 7-amino-6-cyano-4-dimethylamino-2-phenylpteridine.

A mixture of 2.0 g. of the above prepared cyanopteridine, 4.6 g. of phenethylamine and 75 ml. of 2-methoxyethanol is heated at reflux for 20 minutes. Working up as in Example 2 gives 7-amino-4-dimethylamino-6-pteridine-N-phenethylcarboxamidine.

Example 12

Ten grams of 6-amino-4-chloro-2-phenyl-pyrimidine, made as in Example 10, and 7.5 g. of dibutylamine in aqueous solution are refluxed for five hours. Filtering the resulting mixture gives 6-amino-4-dibutylamino-2-phenylpyrimidine.

A mixture of 10.0 g. of the above prepared pyrimidine and 150 ml. of acetic acid are heated to 90° C., then filtered and cooled to 0° C. Four grams of sodium nitrite in aqueous solution are added portionwise. The mixture is allowed to stand for one hour at 0° C., and one hour at room temperature and the precipitated 6-amino-4-dibutylamino-5-nitroso-2-phenylpyrimidine is removed by filtration. This compound is reacted with malononitrile in pyridine to give 7-amino-4-dibutylamino-6-cyano-2-phenylpteridine.

Two grams of 7-amino-4-dibutylamino-6-cyano-2-phenylpteridine, 9.5 g. of propoxyamine and 75 ml. of 2-ethoxyethanol are stirred at room temperature. Dilution with water separates 7-amino-4-dibutylamino-2-phenyl-6-pteridine-O-propylamidoxime.

Example 13

Two grams of 2-(m-aminophenyl)-4,7-diamine-6-cyanopteridine (prepared as in Example 4 from m-aminobenzamidine hydrochloride) is stirred with 3.0 g. of ethylamine in 100 ml. of 2-ethoxyethanol. Addition of water separates the product 2-(m-aminophenyl)-4,7-diamino-6-pteridine-N-ethylcarboxamidine.

Example 14

Treatment of 22.0 g. of α,α,α-trifluoro-p-tolunitrile in ethanol solution with dry hydrogen chloride and then with ethanolic ammonia and working up as described above gives α,α,α-trifluorotoluamidine hydrochloride.

This hydrochloride is reacted with the silver salt of isonitrosomalononitrile in methanol solution and cyclized by refluxing with 5-ethyl-2-methylpyridine to give 4,6-diamino - 5 - nitroso - 2 - (α,α,α - trifluoro - p - tolyl)-pyrimidine. This pyrimidine is reacted with malononitrile in pyridine to give 4,7-diamino-6-cyano-2-(α,α,α-trifluoro-p-tolyl)pteridine.

Benzylamine (15 ml.) and 4,7-diamino-6-cyano-2-(α,α,α-trifluoro-p-tolyl)pteridine (3.0 g.) in 100 ml. of 2-ethoxyethanol are heated at reflux for 20 minutes. Working up as in Example 2 gives 4,7-diamino-2-(α,α,α-trifluoro - p - tolyl) - 6 - pteridine - N - benzylcarboxamidine.

Example 15

A mixture of 1.5 g. of 2-(4'-pyridyl)-4,7-diamino-6-cyanopteridine (prepared as in Example 4 from isonicotinamidine hydrochloride) and 7.5 g. of dibenzylamine in 2-ethoxyethanol is heated at reflux for 30 minutes. Cooling, diluting with water and filtering gives 2-(4'-pyridyl) - 4,7 - diamino - 6 - pteridine - N,N - dibenzylcarboxamidine.

Example 16

Two grams of 4,7-diamino-6-cyano-2-(m-hydroxyphenyl)pteridine, prepared as in Example 4 from m-hydroxybenzamidine hydrochloride, is heated at 50° C. for one hour with excess diethylamine in 2-ethoxyethanol to give, after diluting with water and filtering, 4,7-diamino-2-(m-hydroxyphenyl)pteridine - 6 - N,N - diethylcarboxamidine.

Example 17

To 3 g. of sodium in 125 ml. of phenethyl alcohol is added 5 g. of chloramide in 300 ml. of ether over 90 minutes with stirring. The ether is allowed to distill during the addition after which the stirring is continued for 15 minutes. The mixture is filtered and the filtrate is distilled. Hydrogen chloride gas is passed through the distillate. The mixture is filtered, the filtrate is saturated with hydrogen chloride and concentrated to give as the residue phenethoxyamine hydrochloride.

A mixture of 3.4 g. of phenethoxyamine hydrochloride, 1.1 g. of sodium methoxide and 50 ml. of 2-ethoxyethanol is stirred at room temperature for 30 minutes, then filtered. The filtrate is stirred with 1.5 g. of 4,7-diamino-6-cyano-2-phenylpteridine for 30 minutes at 50° C. Addition of water separates 4,7-diamino-2-phenyl-6-pteridine-O-phenethylamidoxime.

Example 18

A mixture of 2.0 g. of 4,7-diamino-6-cyano-2-phenylpteridine (made as in Example 1) and 75 ml. of 2-ethoxyethanol saturated with methylamine is stirred for 30 minutes. Adding water and working up as in Example 2 gives 4,7-diamino-2-phenyl-6-pteridine-N-methylcarboxamidine.

What is claimed is:

1. A chemical compound having the formula:

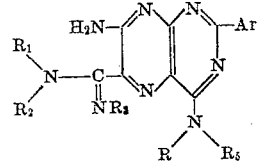

in which Ar is a member selected from the group consisting of phenyl, chlorophenyl, tolyl, methoxyphenyl, α,α,α-trifluorotolyl, hydroxyphenyl, aminophenyl, thienyl and pyridyl; $R_1$ and $R_2$ are members selected from the group consisting of hydrogen, lower alkyl, benzyl and phenethyl; $R_3$ is a member selected from the group consisting of hydrogen and, when $R_1$ and $R_2$ are hydrogen, hydroxy, lower alkoxy, benzyloxy and phenethoxy; and $R_4$ and $R_5$ are members selected from the group consisting of hydrogen and lower alkyl.

2. A chemical compound having the formula:

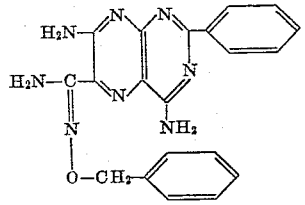

3. A chemical compound having the formula:

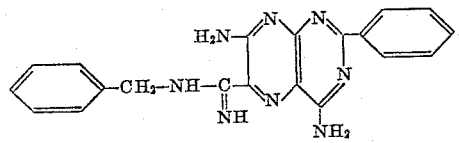

4. A chemical compound having the formula:

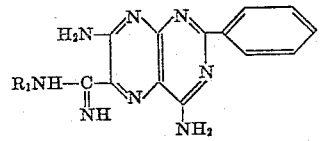

in which $R_1$ is lower alkyl.

5. A chemical compound having the formula:

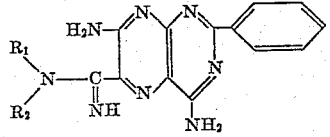

in which $R_1$ and $R_2$ are lower alkyl.

No references cited.